Nov. 22, 1949     B. N. HOFFSTRÖM     2,489,136
VISCOSITY REGULATOR
Filed Jan. 11, 1943     2 Sheets-Sheet 1
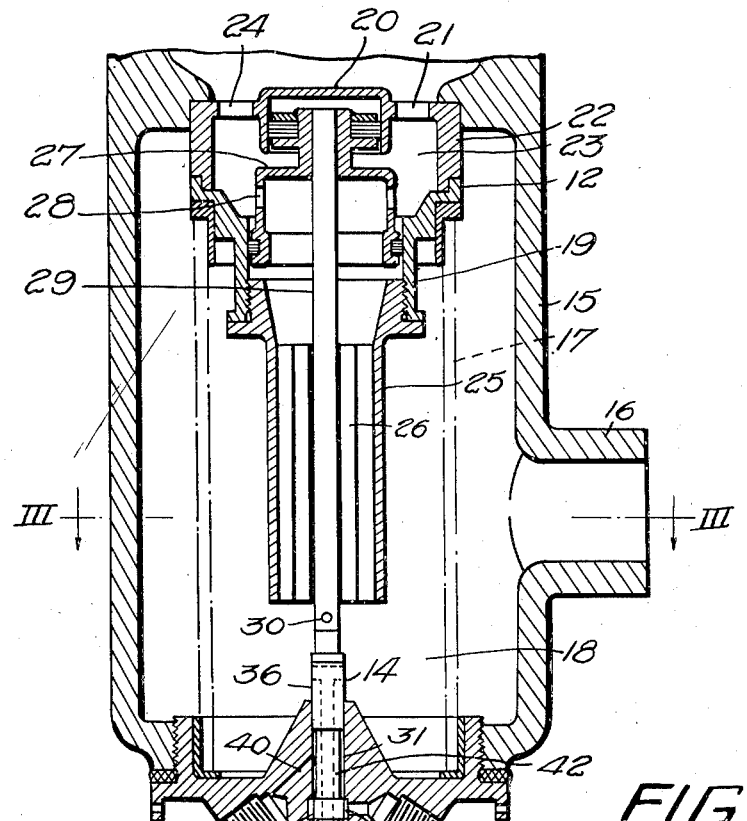
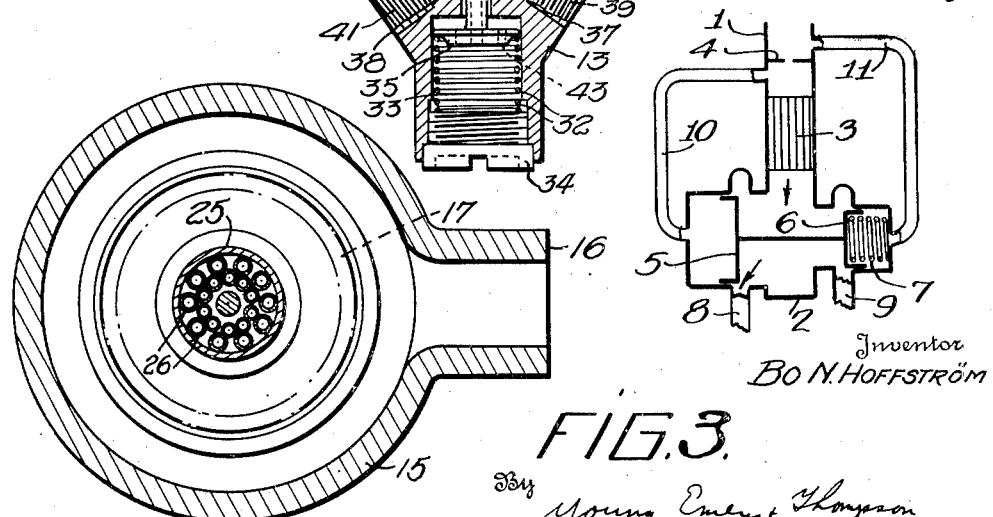

Nov. 22, 1949  B. N. HOFFSTRÖM  2,489,136
VISCOSITY REGULATOR
Filed Jan. 11, 1943  2 Sheets-Sheet 2
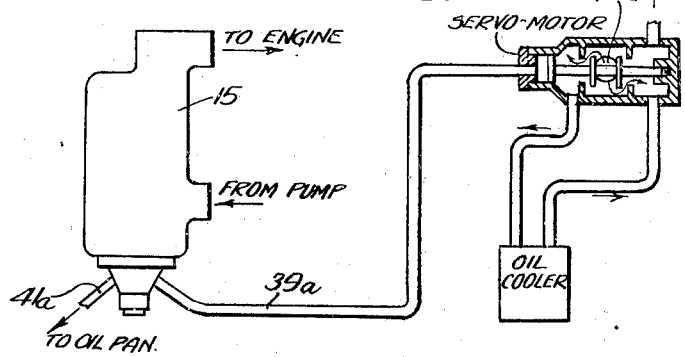
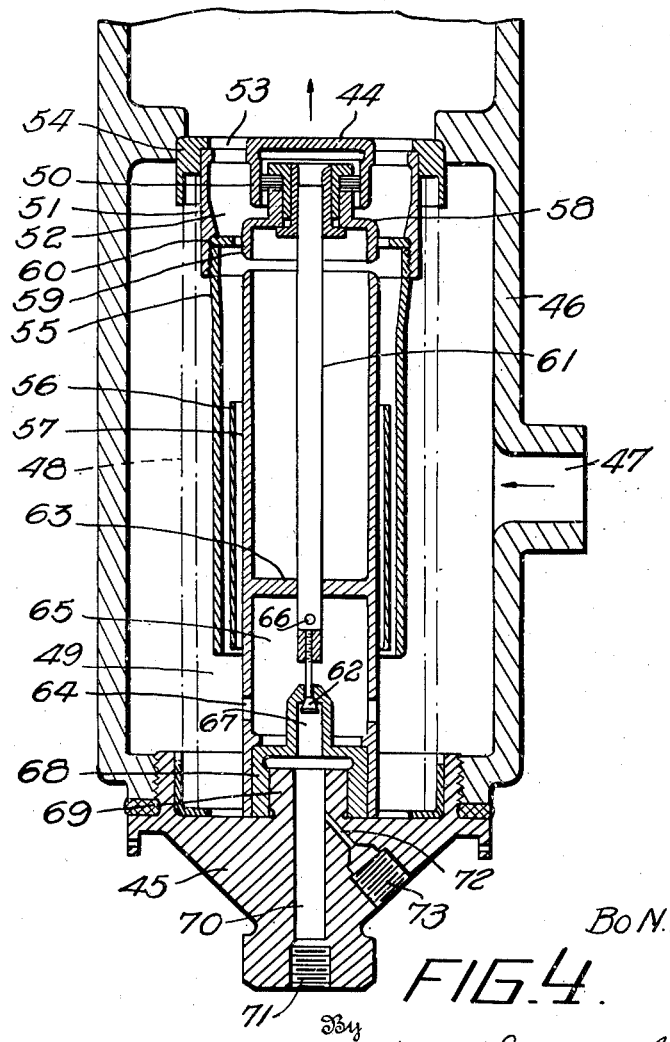
Inventor
BO N. HOFFSTRÖM
By Young, Emery & Thompson
Attorneys Patented Nov. 22, 1949

2,489,136

UNITED STATES PATENT OFFICE 2,489,136

VISCOSITY REGULATOR

Bo N. Hoffström, Malmo, Sweden, assignor to A.-B. Aerotransport, Stockholm, Sweden, a corporation of Sweden Application January 11, 1943, Serial No. 472,083
In Sweden November 29, 1941

Section 1, Public Law 690, August 8, 1946
Patent expires November 29, 1961

7 Claims. (Cl. 137—78)

The present invention refers to an improved regulator for controlling the viscosity of a flowing medium, such as lubricating oil in engines.

For the purpose of controlling the viscosity of a medium such as oil, it is well-known to employ a thermostat regulator controlling a valve device which adjusts the composition of the viscous medium to maintain the viscosity at a predetermined value. In this case it is the temperature of the medium that determines the function of the valve device, and not the viscosity in itself. The calibration of the valve device in respect of the viscosity is then valid for a certain medium of a constant composition only.

It has been recognized as desirable to provide viscosity regulators in which the valve device is controlled in direct response to the viscosity of the medium and which will therefore be capable of being used for various kinds of media without recalibration. Thus, it has been proposed to control the valve device by means of the drop of pressure in a friction channel provided in the path of the medium, said drop of pressure varying as a function of the viscosity of the medium. However, up to now there has been no reliably operating regulator of this kind.

The main object of the present invention is to provide an improved viscosity regulator of the last mentioned type through which a valve device is controlled in direct response to the viscosity of the flowing medium by utilizing the drop of pressure in a friction channel through which the medium is caused to pass.

It is a further object of the invention to provide a viscosity regulator of the type referred to in which the drop of pressure in the friction channel, which is a function not only of the viscosity but also of the velocity of flow of the medium through it, is supplemented by a drop of pressure in another channel or passage through which the medium is caused to flow, this channel or passage being such that the drop of pressure of the medium in it is a function of the velocity of flow of the medium only, this second drop of pressure being utilized for neutralizing the effect on the operation of the regulator of variations in the drop of pressure in the friction channel due to variations in the velocity of flow.

It is a still further object of the invention to provide a viscosity regulator of the type referred to which may be connected in a closed circulation system, e. g. the lubricating system of an internal-combustion engine, in series with the principal elements of the system, such as the crankshaft bearings of an engine, which consume the main part of the pressure obtaining in the system, so that the body of the circulating medium passes through the regulator and the drop of pressure in the latter can be directly used for controlling the valve device, i. e. no hydraulic by-pass resistance is needed for producing a controlling pressure.

The viscosity regulator according to the invention may be employed in conjunction with a valve device which proportions either two branch currents of a medium which respectively run to and by-pass a heat exchanger, or two mixture components delivered to a mixer, so that a predetermined viscosity is maintained or established in the medium after mixing the branch currents or components, respectively.

Other objects and features of the invention will appear from the following description.

The invention will be described in detail with reference to the accompanying drawings, wherein:

Figure 1 is a diagrammatic view of a viscosity regulator which is associated with a valve device and intended to be connected in the oil outlet from an internal-combustion engine;

Figure 2 illustrates, in longitudinal section, a form of the regulator which is intended to be connected either in the oil inlet or in the oil outlet from an engine and to control a separate valve connected in the outlet;

Figure 3 is a transverse section along the line III—III in Figure 2;

Figure 4 illustrates, in longitudinal section, another form of the regulator intended to be used in a similar way as the preceding one;

Fig. 5 is a diagrammatic view illustrating the connection of the regulator with a servo-motor and an oil cooler in an oil circulating system.

With reference to the regulator diagrammatically shown in Figure 1, it consists of a cylinder 1 which at its top is connected with the oil outlet of the engine (or with a return oil pump) and at its bottom opens into the interior of the housing of a valve device 2. In the cylinder 1, a friction body 3 is inserted which consists of a number of juxtaposed tubes, so that the body is passed by many narrow channels in which the oil flowing through them is subjected to a friction resistance. Above the friction body 3 a constricting flange 4 is mounted in the cylinder. The valve device 2 comprises two firmly interconnected pistons 5 and 6 of different areas which are movable in corresponding cylindrical portions of the valve housing. Behind the piston 6 a spiral spring 7 is provided which tends to press the pistons to the left. The pistons each cooperate with a port in the valve housing, and these ports are connected with conduits 8 and 9, respectively, of which the former leads to an oil cooler (not shown) and the latter leads to a point of the oil circuit beyond the cooler, e. g. directly to the oil tank. From a point of the cylinder 1 between the constricting flange 4 and the friction body 3 a conduit 10 leads to the valve housing 2 behind the piston 5, and from a point above the constricting flange 4 another conduit 11 leads to the valve housing behind the piston 6.

For overcoming the friction resistance in the body 3 a certain drop of pressure $p'$ of the flowing oil is required. This drop of pressure is a function of the viscosity of the oil and further a substantially linear function of the oil quantity which is flowing through. Also in the constricting flange 4 a drop of pressure $p''$ is produced which is a function of the second degree of the velocity of the oil, i. e. the oil quantity, but on the other hand is substantially independent of the viscosity of the oil.

Assuming the areas of the pistons 5 and 6 to be $a$ and $b$, respectively, the forces exerted on the pistons by the oil are $$P_1 = p'.a$$
$$P_2 = (p' + p'')b$$

where $P_1$ is the force acting on piston 5 and $P_2$ the force acting on piston 6, and if the force of the spiral spring 7 is F, then in the case of equilibrium $$P_1 - P_2 = F$$

If the viscosity of the oil increases over a desired average value, $P_1$ increases more than $P_2$, and the pistons are pressed to the right, the conduit 8 to the cooler being shut off and the by-pass conduit 9 being more opened. On the other hand, if the oil becomes thinner and the viscosity lower than the average value, the pistons move to the left in a corresponding manner, the conduit 9 being shut off more or less and the conduit 8 being opened.

Thus, the position of the pistons will be a function of the viscosity of the oil. This however takes place only when, as here assumed, a spring is used for balancing the forces on the pistons produced by the drops of pressure. If the spring is omitted, it is certainly possible to attain a displacement of the pistons owing to variations of the viscosity, but this displacement can take place only in the form of a sudden change from one to the other of the end positions of the pistons as $P_1$ or $P_2$ predominates.

The operation of the regulator can be made independent of the velocity of the oil by suitably proportioning the piston areas $a$ and $b$ in relation to each other. This will be shown by the following mathematical considerations.

The condition of equilibrium $$P_1 - P_2 = p'.a - (p' + p'')b = F$$

can also be written $$p'.(a-b) - p''.b = F$$

or, if $$P_f = p'.(a-b) \text{ and } P_s = p''.b$$

by definition, $$P_f - P_s - F = 0$$

The two pressure differentials $p'$ and $p''$ can be expressed as functions of the velocity of the oil by the equations $$p' = k_1.u + N$$

which is a form of Poiseuille's law of the flow of viscous fluids through capillaries, $u$ being the velocity of the oil, $k_1$ a factor proportional to the viscosity of the fluid and to the length of the narrow channels in the body 3 and inversely proportional to the area of said channels, and N an empirical term dependent on the nature of the fluid and the geometrical dimensions of the channels and $$p'' = k_2.u^2$$

which is a form of Bernoulli's equation rendering the relation between the drop of pressure of a fluid flowing in a conduit of variable cross-section and the velocity of said fluid, $k_2$ being a factor dependent on the density of the fluid but independent of the viscosity thereof.

In view of the above explanation of the factor $k_1$, the relation between it and the viscosity $\gamma$ may be expressed as $$k_1 = k_f.\gamma$$

where $k_f$ is a factor independent of the viscosity but dependent on the dimensions of the friction channels.

Hence, $$P_f = (k_f.\gamma.u + N)(a-b)$$
$$P_s = k_2.u^2.b$$

These expressions show that $P_f$ is a force which is dependent both on the velocity and on the viscosity of the oil and $P_s$ is a force which is dependent on the velocity of the oil but independent of the viscosity.

It will be seen that the equation of equilibrium can be valid only at a certain value of the viscosity for which the regulator has been calibrated. $P_f$ and $P_s$ always act on the pistons in opposite directions, and $P_f$ is greater than $P_s$, the difference being balanced by the auxiliary force F. If the viscosity changes, only the term $P_f$ is altered while $P_s$ and F remain unchanged. The system is thus unbalanced and a free force, the regulating force, arises. On the other hand, if the viscosity is held at a desired value, e. g. $\gamma_1$, and $u$ is varied, both $P_f$ and $P_s$ will vary. In this case the equilibrium can be maintained only if the variation of $P_f$ compensates for the variation of $P_s$. The amount of the variation in $P_f$ must be equal to the amount of the variation in $P_s$ for a given amount of the variation in $u$, or $$\frac{dP_f}{du} = \frac{dP_s}{du}$$

Deriving the expressions for $P_f$ and $P_s$ $$\frac{dP_f}{du} = k_f.\gamma.(a-b)$$

$$\frac{dP_s}{du} = 2k_2.u_m.b$$

where $u_m$ is an average value of $u$ within the range of velocities in which the regulator normally operates.

Hence, $$k_f.\gamma.(a-b) = 2k_2.u_m.b$$

or, as $k_f.\gamma = k_1$, $$\frac{b}{a-b} = \frac{k_1}{2k_2.u_m}$$

It will be seen that the relation $$\frac{b}{a-b}$$

which is a fixed quantity for a given design, has to be selected for a desired value of the velocity $u$. When operating within a limited range on either side of the average velocity $u_m$, the deviation which naturally results in a slight variation of the value of the viscosity for which the regulator is adjusted is of no practical importance.

The last equation can also be written $$\frac{a}{b} = \frac{2k_2 \cdot u_m + k_1}{k_1}$$

When designing the regulator three of the quantities $a$, $b$, $k_1$ and $k_2$ are first determined. If, for example, the design of the friction body 3 and the constricting flange 4 has been laid down, $k_1$ and $k_2$ can be determined empirically, either $a$ or $b$ may be chosen at will and the fourth quantity, i. e. $b$ or $a$, is determined so as to satisfy the above condition.

In Figures 2 and 3 a practical form of the viscosity regulator is shown. The regulator comprises an internally cylindrical body 12 having two unequal inner cross sectional areas and a fitting 13 containing a valve slide 14 and connected with the member 12 in axial alignment thereof through an outer conjoining housing 15 which is formed with an inlet piece 16 for the oil. Inside the housing 15 and between the cylinder body 12 and the fitting 13 there is provided a cylindrical oil filter 17 which encloses a space 18. In this space the oil is under a predetermined pressure which is produced for example by means of a pump connected in the inlet conduit connected with the piece 16.

The cylinder body 12 is itself composed of two axially disposed principal parts, of which the part 19 which is turned towards the fitting 13 has the larger inner cross sectional area and the other part 20 includes a cylindrical socket 21 which is closed at its outer end and has the smaller cross sectional area. The part 20 has an outer jacket 22 which surrounds a space 23 situated between the inner part 19 and the socket 21 and connected by ports 24 with a space or a conduit outside the regulator.

The cylinder part 19 having the larger cross sectional area has a friction body 25 fastened by screwing in the end turned towards the fitting 13. This friction body consists of a tube which is provided with a threaded shoulder for the fastening of it by screwing and the interior of which is filled with a number of narrow tubes 26 so that there are formed many narrow channels through which the oil must flow (Figure 3). In the cylinder body 12 a differential piston 27 is slidable, in that it has two parts of different cross sectional areas which fit within the respective cylindrical portions 19 and 21 of the body 12. The piston part movable in the cylinder part 19 is formed as a cup having its hollow turned downwards towards the interior of the regulator, and in its wall there are made a number of constricting ports 28 forming passages for the oil coming from the friction body 25 to the space 23. The differential piston 27 is firmly mounted on an axially bored piston rod 29 which extends through the friction body 25 and cooperates at its inner end with the valve slide 14. Through a radial hole 30 the boring in the piston rod communicates with the space 18 inside the oil filter 17, and the pressure of the oil which fills this space is thus transmitted through the piston rod to oil which stands in the cylindrical socket 21 and acts on the smaller area of the piston 27 in the opposite direction to the oil which has passed through the friction body 25 and acts on the larger area of the piston.

The fitting 13 is formed as a slide valve device. Its valve slide 14 is arranged in a boring 31 in axial alignment with the piston rod 29 and is held pressed against the end of the latter by a spiral spring 32 which is provided in a boring 33 in the outer end of the fitting 13 and is tensioned between a screw plug 34 and a shoulder disc 35 on the valve slide. On the end projecting into the interior of the regulator the valve slide 14 has a slide surface 36 which seals against the wall of the boring 31, and nearer the outer end it has another slide surface 37 which cooperates with an annular turned groove 38 in the fitting 13. In the normal position of the valve slide the slide surface 37 shuts off the groove from communication with the boring 31 in one as well as in the other direction. The turned groove communicates through a channel with a threaded hole 39 in the fitting intended for the connection of a conduit 39a (Fig. 5) which leads to a servo-motor. Furthermore, at a point on the inner side of the turned groove 38 the boring 31 communicates through a channel 40 with another threaded hole 41 in the fitting 13 for the connection of a conduit 41a (Fig. 5) leading to an accumulation station for the oil, preferably the oil sump of the engine. The valve slide 14 has an axial channel 42 which communicates at its inner end with the space 18 within the oil filter 17 and opens at its outer end into the boring 33. The pressure in the space 18 is thereby transmitted to the boring 33, so that it will act on the valve slide from both directions. Oil under pressure which enters into the boring 33 through the axial channel 42 can penetrate into the outer portion of the boring 31, in that the disc 35 is provided with apertures 43 to allow this. Oil under pressure passes from the space 18 through the channel 42 into the boring 33, then through the apertures 43 in the disc 35 to the upper side of the latter, and the space above the disc 35 is in direct communication with the lower part of the boring 31 (under the slide portion 37). When the valve slide occupies its upper position, the oil can further flow through the turned groove 38 to the conduit connected at 39.

Fig. 5 illustrates how the regulator described above is connected with a servo-motor and an oil cooler in an oil circulating system. It is to be understood that the servo-motor can be of any suitable kind which can control a valve in the oil outlet conduit from the engine, so that the valve varies the proportions of the oil which runs to and by-passes the oil cooler, respectively; the servo-motor diagrammatically shown in Fig. 5 is intended only to illustrate the principal mode of operation thereof and is not to be construed as an actual structure.

The viscosity regulator according to Figure 2 is preferably to be connected in the oil inlet conduit of the engine as indicated in Fig. 5. The oil is pumped in from the tank through the inlet 16, passes through the oil filter 17 into the space 18 and after that flows first through the friction body 25, then through the constricting ports 28 and finally through the ports 24 further to the engine. The drops of pressure $p'$ and $p''$ hereby created in the friction body 25 and the constricting ports, 28, respectively, produce on the differential piston 27 a resulting force which at normal oil viscosity is to be in equilibrium with the spring 32. By an analysis corresponding to that given above for Figure 1, it is found that if the viscosity of the oil increases above a desired average value, the differential piston 27 will be pressed downwards in Figure 2 and displace the valve slide 14, so that oil from the servo-motor can flow in at 39, through the boring 31 and the channel 40 and out at 41, the servo-motor being adapted to adjust the control valve in the oil outlet conduit from the engine, so that a larger proportion of the oil by-passes the cooler. If, on the other hand, the viscosity decreases, the differential piston 27 is displaced upwards in Figure 2, the spring 32 pushing the valve slide 14 upwards, so that oil under pressure from the main current through the regulator can be diverted through the channel 42, the boring 33 and the connection 39 to the servo-motor, while the first mentioned communication between the connections 39 and 41 is shut off. The servo-motor now adjusts the control valve in such a manner that more oil is led through the cooler. The relation between the areas of the differential piston has been determined on the basis of the same analysis as in respect of Figure 1, so that the influence of the oil quantity has been eliminated.

The viscosity regulator illustrated in Figure 4 does not differ in principle from that described above except in so far as it operates with a continuous flow of oil through the valve device. Similarly as in Figure 2, the regulator consists of a cylinder body 44 and a fitting 45 containing a valve, said parts being held together by an outer housing 46 which is provided with an inlet piece 47 for oil under pressure. Within the housing 46 and between the parts 44 and 45 there is provided a cylindrical oil filter 48 which encloses a space 49 containing oil under pressure.

The cylinder body 44 comprises a cylindrical socket 50 closed at its outer end and an outer jacket 51 which is concentric with this socket and encloses an annular space 52 which is connected by ports 53 with a space or a conduit outside the regulator. An outer flange ring 54 is provided for carrying the cylinder body and forming a support for the filter cylinder 48.

In the inner end of the jacket 51 which is turned towards the fitting 45 a friction body 55 is screwed. This consists of a cylinder which concentrically encloses another cylinder 56 of a smaller diameter. If desired, several such cylinders may be provided concentrically within each other. Within the cylinder 56 a tube or cylinder 57 which is supported by the fitting 45 is concentrically arranged. The annular spaces between the cylinders 55, 56 and 57 form narrow channels through which the main part of the oil must flow. A differential piston 58 has the one of its parts having the smaller area slidably mounted in the cylindrical socket 50, while the one of its parts which has the larger area is formed with an axially inward-turned cylindrical flange 59 with which the piston can engage the adjacent end of the tube 57 for limiting the stroke in the inward direction. The cylindrical flange 59 extends through the opening of an annular disc 60 which is placed against a shoulder within the jacket 51 where it is held by the cylinder 55. The space 59a between the flange 59 and the ring 60 forms a narrow passage for the oil corresponding to the aperture in the constricting flange 4 in Figure 1 or the ports 28 in the differential piston in Figure 2. This passage is in alignment with the channels in the friction body 55, so that the oil can flow through it without altering its direction. It will be particularly pointed out that the flow of oil does not act on any of the surfaces of the differential piston as in Figure 2, so that there need never be any question of a correction with regard to dynamic pressure. The differential piston 58 is firmly mounted on an axially bored piston rod 61 which extends down through the tube 57 and at its inner end carries a conical valve member 62. The tube 57 is provided with a radial partition 63 which is tightly passed by the piston rod 61, and through ports 64 in the peripheral wall of the tube the space 65 inside the partition 63 communicates with the space 49. Furthermore, as the boring in the piston rod is in communication with the surrounding space 65 through a radial hole 66, the pressure of the oil which fills the space 49 within the oil filter 48 is transmitted to the oil which stands in the cylindrical socket 50. This pressure will thus act on the smaller area of the piston in the opposite direction to the pressure on the larger area of the piston of the oil which has passed through the friction body 55. A spiral spring 74 is provided within the tube 57 between the partition 63 and the differential piston 58 to exert an upward pressure on the piston.

The conical valve member 62 which is formed on a shank fastened to the end of the piston rod 61 is slidably mounted in a boring 67 in a socket-shaped member 68 which is placed over an axial boss 69 on the inner side of the fitting 45 and is surrounded by the tube 57. The boring 67 is formed with a seat for the conical valve member 62 which is arranged so that the passage is shut off at the upward movement of the piston in Figure 4. The fitting 45 has throughout its length an axial boring 70 which at its outer end is formed with a threaded connection 71 for a conduit equivalent to conduit 39a in Fig. 5 and leading to the servo-motor. In the fitting 45 there is further made a narrow channel 72 which issuing from the boring 70 opens into a threaded hole 73 in the side of the fitting for connecting a conduit equivalent to conduit 41a in Fig. 5 and leading to the accumulation station for the oil.

The valve member 62 is so arranged in relation to the seat in the boring 67 that it stands in an intermediate position when the oil flowing through the regulator has normal viscosity. A minor proportion of the oil standing under pressure in the spaces 49 and 65 thus continuously flows past the conical valve member 62 to the boring 70 and further through the narrow channel 72 to the accumulation station for the oil. On this account there obtains in the boring 70 and thereby in the servo-motor a certain lower pressure than in the spaces 49 and 65, the servo-motor holding the control valve for the oil currents to and past the cooler, respectively, at a certain position determined by the desired viscosity. If, however, the viscosity increases for some reason, the regulator operates in exactly the same manner as was described in connection with Fig. 2, in that the differential piston is pressed downwards in Fig. 4 and the passage area of the conical valve is increased. On this account the pressure in the boring 70 increases, which causes a movement of the servo-motor in such a direction that a larger proportion of the oil by-passes the cooler. If, on the other hand, the viscosity becomes lower, the valve passage area decreases, the pressure in the boring 70 being reduced and the servo-motor moved in the reverse direction.

The invention can be carried into effect in a plurality of other forms than those described above, and therefore it is not to be considered limited to these.

Moreover, the invention is not limited to the control of the viscosity of lubricating oil but can advantageously be applied wherever it is a question of keeping the viscosity of a viscous medium constant.

What I claim and desire to secure by Letters Patent is:

1. In an apparatus responsive to the viscosity of a continually circulating medium in a main flow conduit, a housing interposed in the main conduit and defining a path of flow of the medium through a portion of said conduit, a friction channel body including a number of parallel narrow friction channels and mounted within said housing in said path, orifice means provided within said housing and connected in series with said friction channel body in said path, a differential piston having areas exposed to the pressures respectively before, between and after said friction channel body and said orifice means so as to respond differentially to the pressure differentials set up across said friction channel means and said orifice means as a result of the flow of the medium therethrough.

2. In an apparatus responsive to the viscosity of a continually circulating medium in a main flow conduit, means interposed in the main conduit and defining a path of flow of the medium in said conduit, friction channel means in said path, orifice means connected in series with said friction channel means in said path, a differential piston having areas exposed to the pressures respectively before, between and after said friction channel means and said orifice means so as to respond differentially to the pressure differentials set up across said friction channel means and said orifice means as a result of the flow of the medium therethrough.

3. In an apparatus responsive to the viscosity of a continually circulating medium in a main flow conduit, a housing interposed in the main conduit and defining a path of flow of the medium in said conduit, cylindrical friction channel means provided within said housing in said path, orifice means provided within said housing and connected in series with said friction channel means in said path, a cylindrical hollow body mounted within said housing coaxially with said friction channel means, a differential piston movable in said hollow body and having areas exposed to the pressures respectively before, between and after said friction channel means and said orifice means so as to respond differentially to the pressure differentials set up across said friction channel means and said orifice means as a result of the flow of the medium therethrough.

4. In an apparatus responsive to the viscosity of a continually circulating medium in a main flow conduit, a housing interposed in the main conduit and defining a path of flow of the medium in said conduit, cylindrical friction channel means provided within said housing in said path, orifice means provided within said housing and connected in series with said friction channel means in said path, a cylindrical hollow body mounted within said housing coaxially with said friction channel means, a differential piston movable in said hollow body and having areas exposed to the pressures respectively before, between and after said friction channel means and said orifice means so as to respond differentially to the pressure differentials set up across said friction channel means and said orifice means as a result of the flow of the medium therethrough, a piston rod associated with said differential piston and arranged coaxially within said friction channel means, said piston rod having an axial boring connecting the interior of said housing at the input side of said friction channel means and said orifice means with a space in said hollow body for transmitting the pressure of the medium to a face of said differential piston bounding said space.

5. In an apparatus responsive to the viscosity of a continually circulating medium in a main flow conduit, means interposed in the main flow conduit and defining a path of flow of the medium through a portion of said conduit, friction channel flow controlling means in said path, orifice flow controlling means connected in series with said friction channel flow controlling means, movable means differentially responsive to pressure differentials set up across both of said flow controlling means on one hand and across one of said control means on the other hand, as a result of the flow of medium therethrough, and valve means operative in response to the operation of said movable means and connected in the path of flow of a hydraulic servo medium for controlling the viscosity of the continually circulating medium.

6. An apparatus for regulating the viscosity of a continually circulating medium in a main flow conduit comprising means interposed in the main conduit and defining a path of flow of the medium in said conduit, friction channel flow controlling means in said path, orifice flow controlling means connected in series with said friction channel flow controlling means, movable means differentially responsive to pressure differentials set up across both of said flow controlling means on one hand and across one of said control means on the other hand as a result of the flow of the medium therethrough, a branch path for said medium, valve means actuated by said differentially responsive means and controlling flow of medium from said path into said branch path of the medium for establishing pressure variations therein depending on the response of said differentially responsive means, and means responsive to pressure of the medium in said branch path for adjusting the viscosity of the medium in the main conduit according to said response.

7. An apparatus for regulating the viscosity of a continually circulating medium in a main flow conduit comprising means interposed in the main conduit and defining a path of flow of the medium in said conduit, friction channel flow controlling means in said path, orifice flow controlling means connected in series with said friction channel flow controlling means, movable means differentially responsive to pressure differentials set up across both of said flow controlling means on one hand and across one of said control means on the other hand as a result of the flow of the medium therethrough, a branch path for said medium means enclosing a space which is interposed in said branch path of said medium, valve means inserted in said branch path and actuated by said differentially responsive means, and means forming a constricted channel interposed in said branch path in series with said space and said valve means in such a way that said space is situated between said valve means and said channel, the arrangement being such that said valve means allow a continual flow of the medium through said branch path in a condition of said differentially responsive means corresponding to normal viscosity of the medium, said valve means in its operation causing pressure variations in said space depending on the response of said differentially responsive means, and means responsive to pressure of the medium in said space for adjusting the viscosity of the medium in the main circuit according to such response.

BO N. HOFFSTRÖM.

REFERENCES CITED

The following references are of record in the file of this patent:

UNITED STATES PATENTS

| Number | Name | Date |
|---|---|---|
| 1,975,937 | Graham | Oct. 9, 1934 |
| 2,028,186 | Booth | Jan. 21, 1936 |
| 2,028,187 | Booth | Jan. 21, 1936 |
| 2,042,860 | Peabody et al. | June 2, 1936 |
| 2,140,735 | Clarke | Dec. 20, 1938 |
| 2,194,605 | Mapel | Mar. 26, 1940 |

FOREIGN PATENTS

| Number | Country | Date |
|---|---|---|
| 241,652 | Great Britain | Oct. 29, 1925 |
| 257,352 | Great Britain | Sept. 2, 1926 |
| 615,029 | France | Oct. 1, 1926 |